(12) United States Patent
Zhao et al.

(10) Patent No.: US 12,128,770 B2
(45) Date of Patent: Oct. 29, 2024

(54) METHODS AND SYSTEMS FOR BATTERY POWER ALLOCATION CONTROL IN A BEV

(71) Applicant: Ford Global Technologies, LLC, Dearborn, MI (US)

(72) Inventors: Yanan Zhao, Ann Arbor, MI (US); Ming Lang Kuang, Canton, MI (US); Carol Louise Okubo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 17/659,918

(22) Filed: Apr. 20, 2022

(65) Prior Publication Data
US 2023/0339333 A1 Oct. 26, 2023

(51) Int. Cl.
| | | |
|---|---|---|
| *B60L 15/20* | (2006.01) | |
| *B60L 50/60* | (2019.01) | |
| *B60L 58/10* | (2019.01) | |
| *G01C 21/34* | (2006.01) | |
| *B60K 17/356* | (2006.01) | |

(52) U.S. Cl.
CPC ........... *B60L 15/2045* (2013.01); *B60L 50/60* (2019.02); *B60L 58/10* (2019.02); *G01C 21/3469* (2013.01); *B60K 17/356* (2013.01)

(58) Field of Classification Search
CPC ...... B60L 15/2045; B60L 50/60; B60L 58/10; G01C 21/3469; B60K 17/356
See application file for complete search history.

(56) References Cited

U.S. PATENT DOCUMENTS

| | | | |
|---|---|---|---|
| 7,441,845 B2 | 10/2008 | Crombez et al. | |
| 8,025,551 B2* | 9/2011 | Torres | A63H 33/003 446/431 |
| 9,032,748 B2* | 5/2015 | Lau | F04D 27/00 62/185 |
| 9,827,866 B2 | 11/2017 | Burow et al. | |
| 2012/0039623 A1* | 2/2012 | Hiramatsu | G03G 21/0005 399/98 |
| 2017/0334431 A1* | 11/2017 | Iwamitsu | B60W 20/40 |
| 2019/0263413 A1 | 8/2019 | Hancock et al. | |

* cited by examiner

*Primary Examiner* — Edwin A Young
(74) *Attorney, Agent, or Firm* — David Kelley; McCoy Russell LLP

(57) ABSTRACT

Methods and systems are provided, including a method for an electric vehicle battery distribution among at least three motors. The method may comprise selecting a first drive path with at least first and second motors for an open-loop power allocation control, designating a second drive path with at least a third motor for an open-loop or a closed-loop power allocation control, determining a power allocation ratio of each motor relative to a total power; and operating the each motors with adjusted power limits based on the determined power allocation ratios.

20 Claims, 8 Drawing Sheets

METHODS AND SYSTEMS FOR BATTERY POWER ALLOCATION CONTROL IN A BEV

FIELD

The present description relates generally to methods and systems for controlling battery power allocation in a vehicle.

BACKGROUND/SUMMARY

Electric vehicles are selectively driven using one or more battery-powered electric machines. Electric vehicles may use electric machines instead of, or in addition to, an internal combustion engine. Example electric vehicles include battery electric vehicles (BEVs) with an energy storage device such as a battery containing multiple battery cells that store electrical power for powering the electric machine. Battery capacity may vary over the lifetime of the device and maintaining operation within battery power limits on both charging and discharging during vehicle operation is generally desirable. Furthermore, vehicle performance may be enhanced by fully utilizing battery capability when desired.

Battery power control ensures instantaneous electrical power usage from the total of all motors and high voltage (HV) accessories do not exceed battery power limits. Power allocation control distributes available electrical power limits to each motor. A BEV may be equipped with multiple independent electric motors, for example a motor positioned at each wheel, referred to as a 4-motor BEV. A 3-motor BEV is a configuration with a motor at each corner of one axle and a single motor at the other axle. Both configurations enable independent wheel torque control, provide control flexibility for torque vectoring, vehicle lateral control, and off-road feature controls etc. Each motor may operate at different torque requests and different speeds, thus consuming or generating electric power. In some examples, 3-motor and 4-motor BEV configurations may introduce challenges for battery power control including power allocation to differently operating motors.

An example power allocation for all wheel drive BEVs with independent driven front and rear with one motor on each may use a split ratio based on torque request. However, such a design is not applicable to 3-motor and 4-motor BEVs due to their various motor torque and speed operating conditions driven by independent wheel torque control, resulting in an inability of the torque domain to represent intended power requests robustly. For example, in the case of vehicle cornering, motors at an outer side of the wheels may have higher speed and provide propulsive torque, while motors at an inner side of the wheels may have lower speed and provide regenerative braking torque. When distributing a battery power among the motors, it is desirable to operate within available power limits as to charging and discharging of the battery.

In one example, the issues described above may be addressed by a method for an electric vehicle battery distribution among at least three motors, the method comprising: selecting a first drive path with at least first and second motors for an open-loop power allocation control; designating a second drive path with at least a third motor for an open-loop or a closed-loop power allocation control; determining a power allocation ratio of each motor relative to a total power; and operating the motors with adjusted power limits based on the determined power allocation ratios. In this way, power allocation control for a BEV with at least three motors is enabled.

As one example, the first drive path and the second drive path may include a first axle and a second axle, respectively. A first power allocation ratio may be determined for the first and second motors relative to total power of the first and second axles. A second power allocation ratio may be determined for the third motor relative to a total power of the second axle. In one example, the first, second, and third motors may be independently controlled motors such that torque, power, and/or speed may be independently controlled, for example. In one example, the method for battery distribution may include separating power requests of each motor into positive requests and negative requests. The method may further include determining power allocation ratios separately for positive power requests and negative power requests. In one example, the method may include adjusting the battery maximum power limit based on the negative power requests. As another example, adjusting the battery limits may include adjusting the battery minimum power limit based on the positive power requests. In one example, closed-loop power allocation control may include feedback including an actual electrical power consumed by the motors in the first drive path, while open-loop power allocation control may not include axle feedback of an actual electrical power consumed by the motors in the second drive path. In one embodiment, the control system may include instructions to designate the second drive path for open-loop power allocation control. In such an embodiment, the controller may determine the power allocation ratio for the first and second motor of the first drive path and the at least a third motor of the second drive path relative to total power request of the first axle and the second axle.

The disclosed methods provide a means to calculate and allocate available power for vehicle propulsion and may be robust to different combinations of motor operation conditions. By adjusting battery limits and allocating power in this way, an electric vehicle with at least three motors may maintain battery usage within available electrical power limits. The technical effect of allocating battery power using open-loop and closed-loop control is that operation of 3-motor and 4-motor configuration BEVs may be enabled providing drivers more choice in the electric vehicle market.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
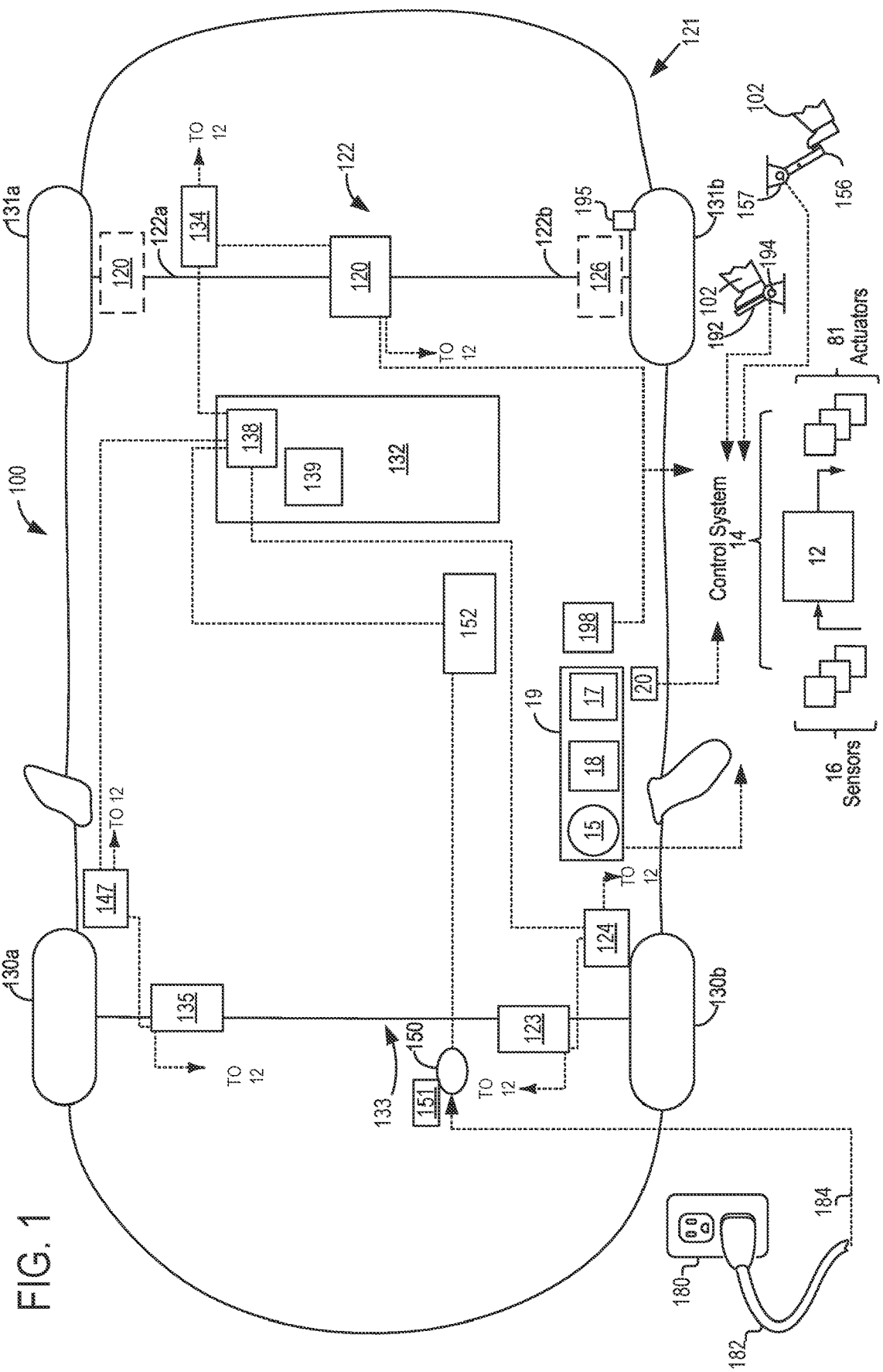
FIG. 1 is a schematic diagram of a vehicle driveline.
Figure 2:
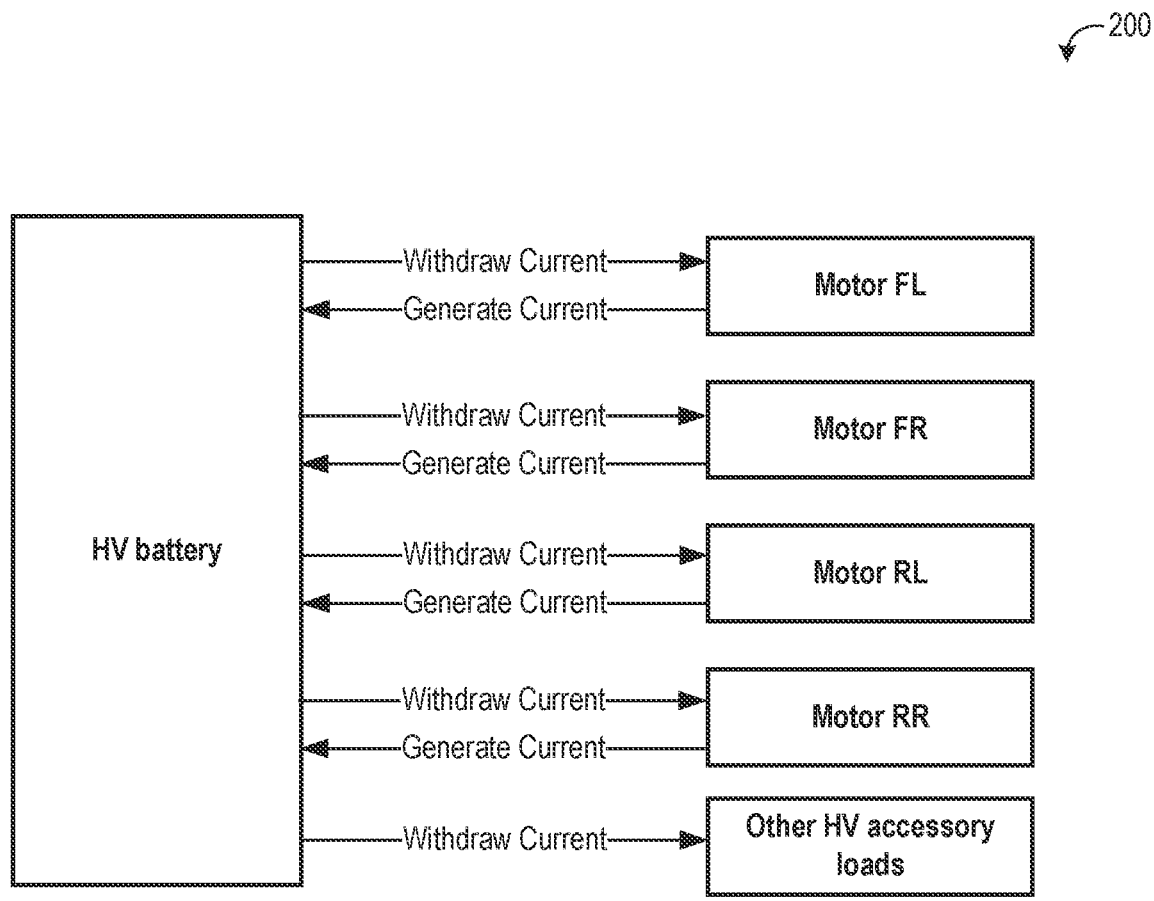
FIG. 2 is a schematic diagram illustrating electrical current flow in a 4-motor BEV.
Figure 4:
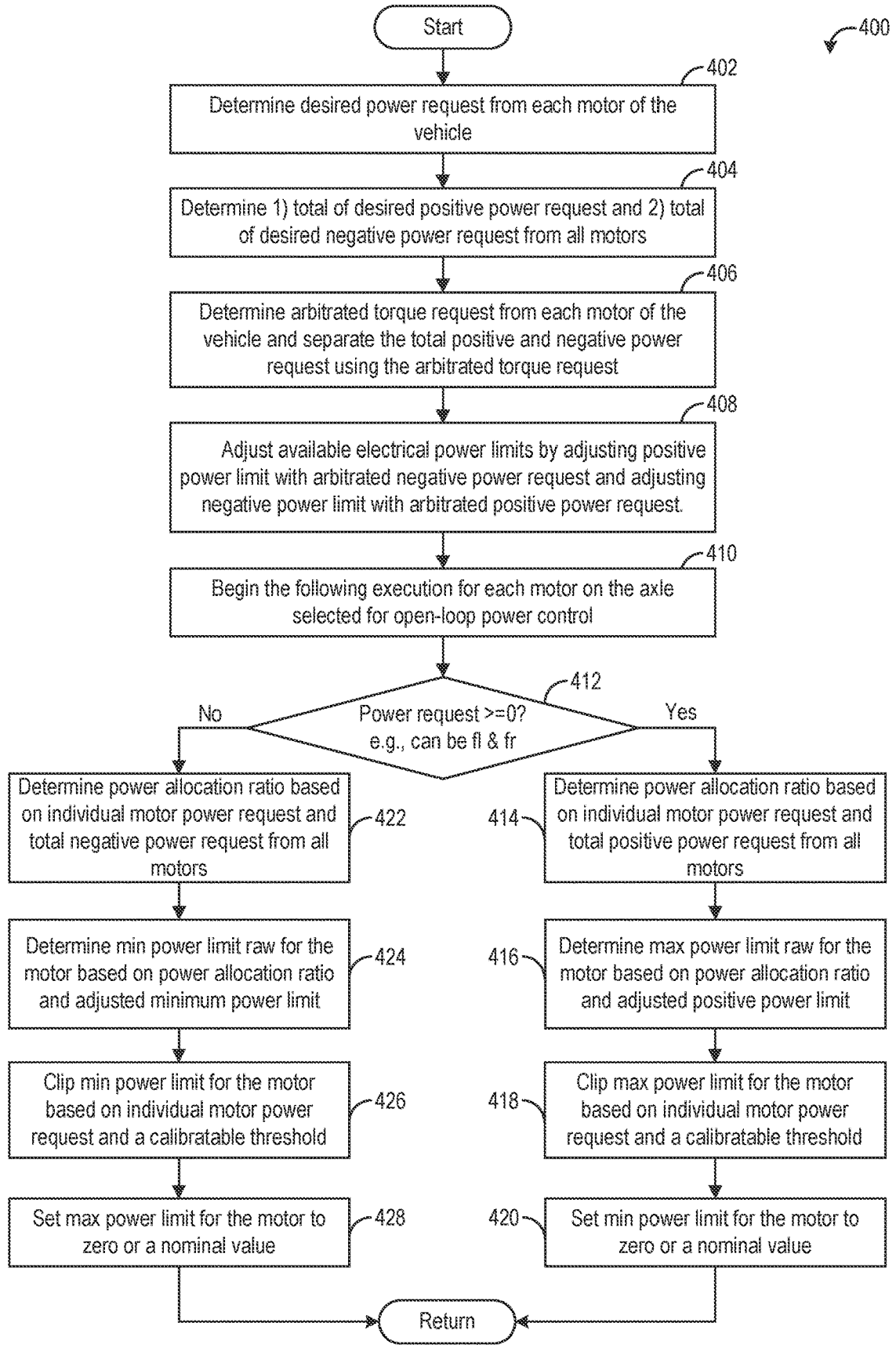
FIG. 4 is a flow chart illustrating a method for open-loop power allocation.
Figure 5:
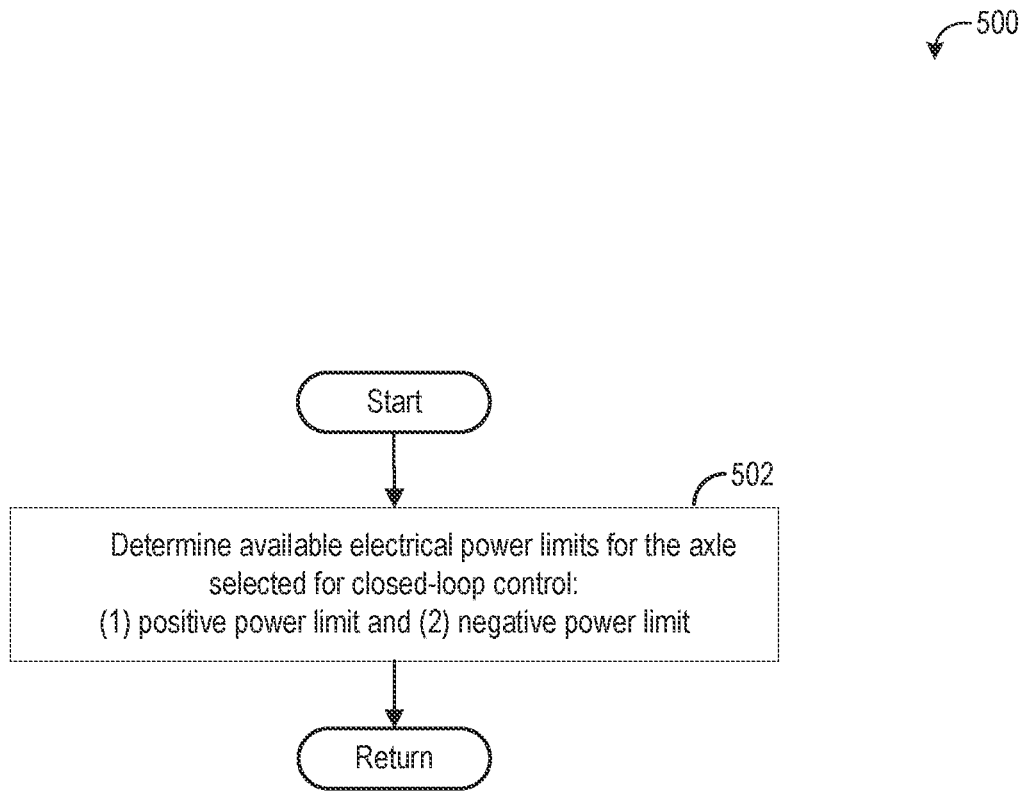
FIG. 5 is a flow chart illustrating a method for closed-loop power allocation in a 3-motor BEV.
Figure 6A:
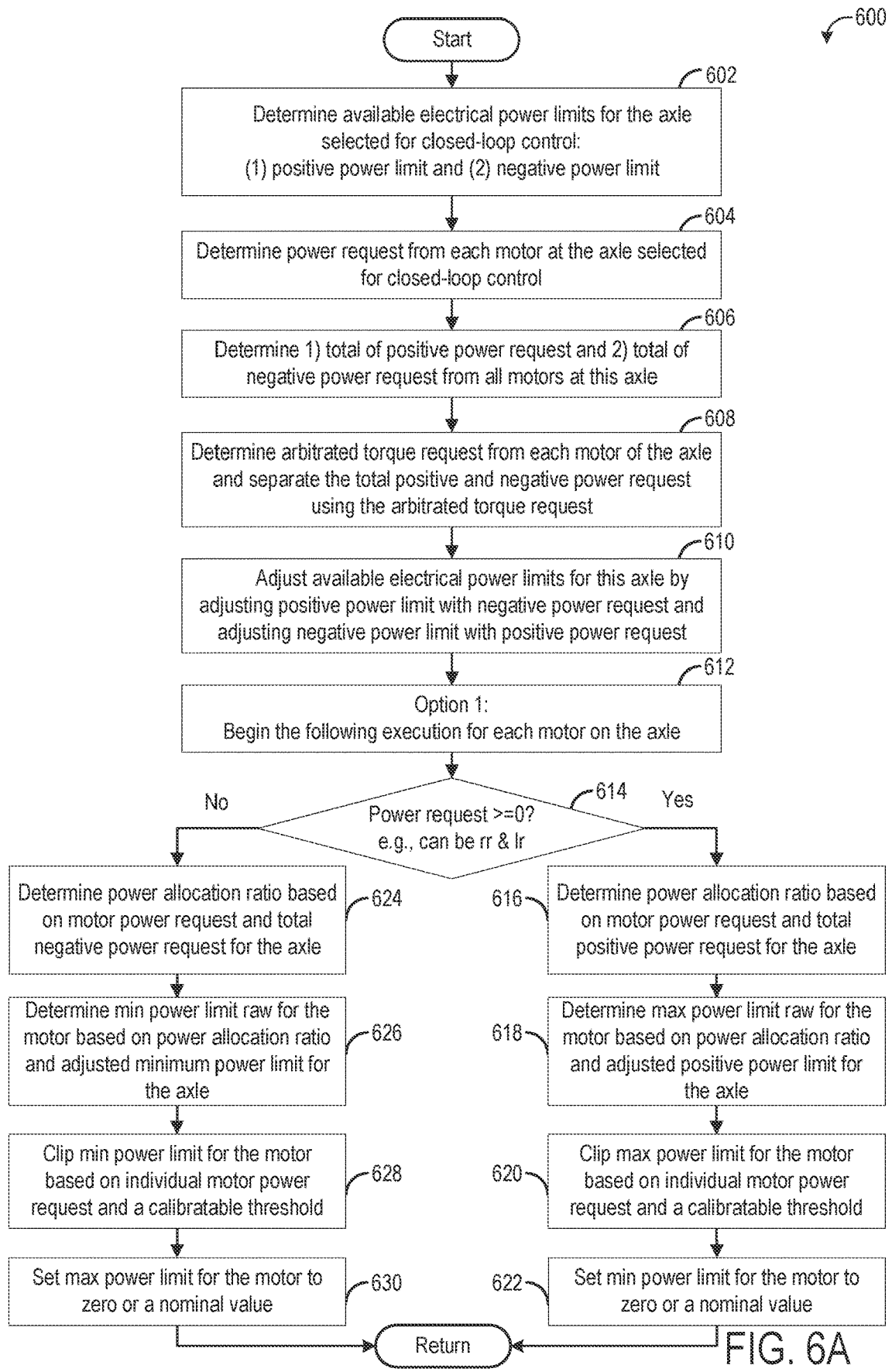
FIG. 6A is a flow chart illustrating a first embodiment of a method for closed-loop power allocation in a 4-motor BEV.
Figure 6B:
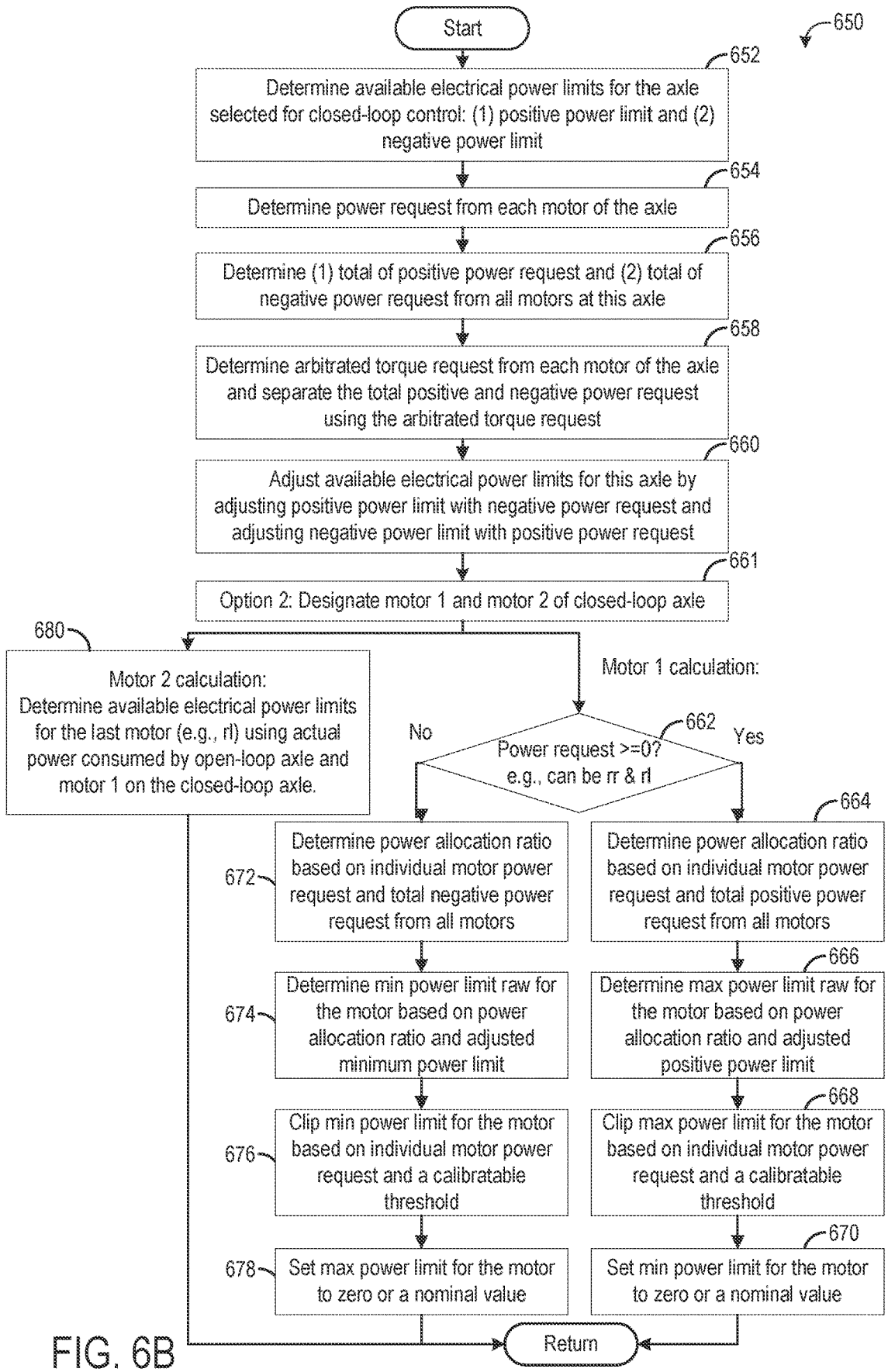
FIG. 6B is a flow chart illustrating a second embodiment of a method for closed-loop power allocation in a 4-motor BEV.
Figure 7:
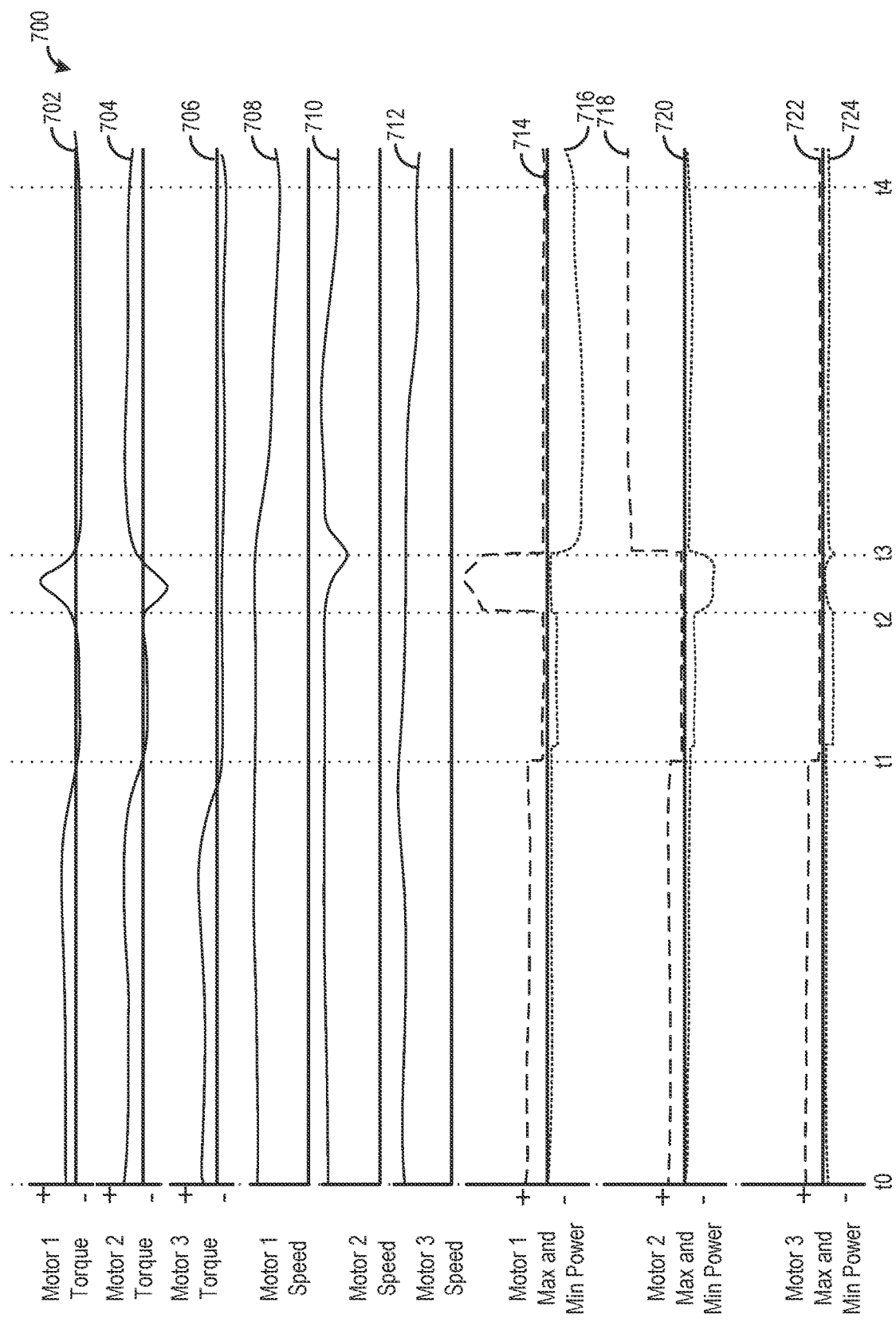
FIG. 7 is a timing diagram illustrating an example prophetic operation of an electric vehicle battery distribution method.

The following description relates to systems and methods for electric vehicle battery distribution among at least three motors. FIG. 1 shows an example vehicle system that includes a driveline with three or more electrical motors. During vehicle operation, at one time instant, one or more electrical motors of the vehicle system may withdraw electrical current from the electric vehicle battery and/or one or more electrical motors of the vehicle system may simultaneously generate electrical current for charging the battery. FIG. 2 shows a schematic diagram of motor consumption and contribution to battery electrical power in a 4-motor BEV. Power may be allocated to motors of the system based on calculated maximum and minimum battery power limits available. A controller may be configured to perform control routines, such as the example routine of FIG. 3, to allocate power based on selecting a first drive path with at least first and second motors for an open-loop power allocation control and designating a second drive path with at least a third motor for a closed-loop power allocation control. FIG. 4 illustrates a flow chart for an example method for open-loop power allocation control of the first drive path. In one example, the drive path not selected for open-loop control (e.g., a second drive path) may use closed-loop power allocation. FIG. 5 illustrates a flow chart for an example method for closed-loop power allocation control of the second drive path in a 3-motor BEV. FIG. 6A illustrates a flow chart for closed-loop power allocation control of the second drive path in a 4-motor BEV. FIG. 6B illustrates a flow chart for an additional or alternative method for closed-loop power allocation control of the second drive path in a 4-motor BEV. A timing diagram for an example prophetic operation of a power allocation routine in a 3 motor BEV is illustrated in FIG. 7.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120, a second electric machine (e.g., a propulsive force electric machine) 135, and a third electric machine 123 for propelling vehicle 121. In an additional or alternative embodiment, vehicle propulsion system 100 may include a fourth electric machine 126. Electric machines 120, 135, 123, 126 (when included) are controlled via controller 12. In one example, electric machines 120, 135, 123, 126 are independent. For example, electric machines 120, 135, 123, 126 may have independently controlled torque and/or power and/or speed. Controller 12 receives signals from the various sensors shown in FIG. 1. In addition, controller 12 employs the actuators shown in FIG. 1 to adjust driveline operation based on the received signals and instructions stored in memory of controller 12. In some examples, the vehicle propulsion system 100 may include an internal combustion engine (not shown).

Vehicle propulsion system 100 has a front axle 133 and a rear axle 122. In some examples, rear axle may comprise two half shafts, for example first half shaft 122a, and second half shaft 122b. Vehicle propulsion system 100 further includes front wheels 130a, 130b and rear wheels 131a, 131b. In this example, front wheels 130a, 130b, and/or rear wheels 131a, 131b may be driven via electrical propulsion sources. The rear axle 122 is coupled to electric machine 120. Electric machine 120 is shown incorporated into rear axle 122. In another embodiment, electric machine 120 may be incorporated into a corner of rear axle 122 near rear wheel 131a and electric machine 126 may be incorporated into the other corner of rear axle 122 rear wheel 131b. Electric machine 135 is shown incorporated into a corner of front axle 133 near front wheel 130a and electric machine 123 is shown incorporated into the other corner of front axle 133 near front wheel 130b. In another embodiment, a single electric machine may be coupled to the front axle 133 and a pair of electric machines may be coupled to the rear axle 122.

Electric machines 120, 135, and 123 may receive electrical power from electric energy storage device 132 (also referred herein as battery or HV battery). In one example, electric energy storage device 132 is an onboard electrical energy storage device. Furthermore, electric machines 120 and 135 may provide a generator function to convert the kinetic energy of the vehicle into electrical energy, where the electrical energy may be stored at electric energy storage device 132 for later use by electric machines 120, 135, and/or 123. A first inverter system controller 134 may convert alternating current (AC) generated by electric machine 120 to direct current (DC) for storage at electric energy storage device 132 and vice versa. A second inverter system controller 147 may convert AC generated by electric machine 135 to DC for storage at electric energy storage device 132 and vice versa. A third inverter system controller 124 may convert AC generated by electric machine 123 to DC for storage at electric energy storage device 132 and vice versa. Electric energy storage device 132 may be a battery, capacitor, inductor, or other electric energy storage device. In one embodiment, one or more additional inverter system controllers may convert current for use by one or more additional electric machines such as fourth electric machine 126 in an exemplary 4-motor BEV configuration.

In some examples, electric energy storage device 132 may be configured to store electrical energy that may be supplied to other electrical loads residing on-board the vehicle (other than the motors), including HV components such as cabin heating and air conditioning, headlights, cabin audio and video systems, etc.

Control system 14 may communicate with one or more of electric machine 120, electric energy storage device 132, electric machine 135, electric machine 123, and so on. Control system 14 may receive sensory feedback information from one or more of electric machine 135, electric machine 120, electric machine 123, electric energy storage device 132, etc. Further, control system 14 may send control signals to one or more of electric machine 135, electric machine 120, electric machine 123, electric energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156. In one embodiment, control system 14 may be in electronic communication with one or more additional electric machines such as electric machine 126.

Electric energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to electric energy storage device 132 from power source 180 via an electrical energy transmission cable 182. During a recharging operation of electric energy storage device 132 from power source 180, electrical energy transmission cable 182 may electrically couple electric energy storage device 132 and power source 180. In some examples, power source 180 may be connected at inlet port 150. Furthermore, in some examples, a charge status indicator 151 may display a charge status of electric energy storage device 132.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

In some examples, electrical energy from power source 180 may be received by charger 152. For example, charger 152 may convert alternating current from power source 180 to direct current (DC), for storage at electric energy storage device 132.

While the vehicle propulsion system is operated to propel the vehicle, electrical energy transmission cable 182 may be disconnected between power source 180 and electric energy storage device 132. Control system 14 may identify and/or control the amount of electrical energy stored at the electric energy storage device, which may be referred to as the state of charge (SOC).

In other examples, electrical energy transmission cable 182 may be omitted, where electrical energy may be received wirelessly at electric energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging electric energy storage device 132 from a power source that does not comprise part of the vehicle. In this way, electric machine 120, electric machine 135, and electric machine 123 may propel the vehicle by utilizing a stationary electric power source.

Electric energy storage device 132 may have a discharge and/or charge power limit beyond which supply of energy to and/or from the electric energy storage device 132, for some length of time, may degrade the device 132. Vehicle propulsion system 100 may operate one or more control routines described herein for allocating electrical power to the plurality of electric machines and other accessories without exceeding power limits. In one example, vehicle propulsion system 100 may calculate a motoring power limit (e.g., positive electrical power limit) by subtracting a total high voltage accessory power consumption from the battery discharge power limit. Vehicle propulsion system 100 may calculate a generating power limit (e.g., negative electrical power limit) by subtracting the total high voltage accessory power consumption from the battery charge power limit. Then, a control routine may include selecting a first drive path with at least first and second motors of a first axle for an open-loop control and designating a second drive path with at least a third motor of a second axle for closed-loop control. Open-loop control may determine the power allocation ratio for the motors at the first axle relative to a total power with inputs such as motor torque request, motor speed, and battery power charge and discharge limits. Closed-loop control may determine the power allocation ratio for the motor(s) at the second axle with the inputs described above and the actual electrical power consumed by the motors on the first (e.g., open-loop controlled) axle. The motors may then be operated with adjusted power limits based on the determined power allocation ratio.

Vehicle propulsion system 100 may also include an ambient temperature/humidity sensor 198. Vehicle propulsion system 100 may further include an accelerometer 20.

Controller 12 may comprise a portion of a control system 14. In some examples, controller 12 may be a single controller of the vehicle. Controller 12 as shown in FIG. 1 may be a microcomputer, including a microprocessor unit, input/output ports, an electronic storage medium for executable programs (e.g., executable instructions) and calibration values shown as non-transitory read-only memory chip in this particular example, random access memory, keep alive memory, and a data bus. Control system 14 is shown receiving information from a plurality of sensors 16 (various examples of which are described herein) and sending control signals to a plurality of actuators 81 (various examples of which are described herein). As one example, sensors 16 may include one or more wheel speed sensors 195, and ambient temperature/humidity sensor 198.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator interface 15 may include interfaces that require a physical apparatus, such as an active key, that may be inserted into the operator interface 15 to turn on the vehicle, or may be removed to turn off the vehicle. Other examples may include a passive key that is communicatively coupled to the operator interface 15. The passive key may be configured as an electronic key fob or a smart key that does not have to be inserted or removed from the operator interface 15 to operate the vehicle. Rather, the passive key may need to be located inside or proximate to the vehicle (e.g., within a threshold distance of the vehicle). Still other examples may additionally or optionally use a start/stop button that is manually pressed by the operator to turn the vehicle on or off. In other examples, a remote vehicle start may be initiated remote computing device (not shown), for example a cellular telephone, or smartphone-based system where a user's cellular telephone sends data to a server and the server communicates with controller 12 to start the vehicle.

In this way, the systems of FIG. 1 enable a system for an electrically propelled vehicle, comprising an electric vehicle battery, a first motor and a second motor coupled to a first axle of the vehicle, a third motor coupled to a second axle of the vehicle and a control system. The control system includes instructions for selecting a first drive path with at least the first and second motors for an open-loop power allocation control, designating a second drive path with at least the third motor for an open-loop or a closed-loop power allocation control, determining a power allocation ratio of each motor relative to a total power request, determining adjusted power limits based on arbitrated power requests; and operating each motor with allocated power limits based on the adjusted power limits and the determined power allocation ratio. In one embodiment, the control system may include instructions to designate the second drive path for closed-loop power allocation control. In one embodiment, determining the power allocation ratio of each motor relative to the total power request includes determining a first power allocation ratio of the first and second motors relative to total power request of the first axle and the second axle and determining a second power allocation ratio of the third motor relative to total power request of the second axle. In one embodiment, the control system may include instructions to designate the second drive path for open-loop power allocation control. In such an embodiment, the controller may determine the power allocation ratio for the first and second motor of the first drive path and the at least a third motor of the second drive path relative to total power request of the first axle and the second axle. In one embodiment, the control system further includes instructions for separating power requests of each motor into positive requests and negative requests, wherein determining the power allocation ratio is determined separately for positive power requests and negative power requests, and power allocation ratio for each motor is determined based on its power request divided by the total power request with a same positive or negative sign.

FIG. 2 shows a schematic diagram 200 depicting scenarios of electrical current flow, e.g., power flow, between an HV battery and electrical motors in a 4-motors BEV. As shown, at one time instant, a motor can withdraw current from the battery, consuming battery power. At the other time instant, the same motor can generate current to the battery, charging the battery. At the same time instant, one motor or multiple motors can withdraw current, and the other motors can generate current. Overall, the net battery discharge or charge limit may be determined including different potential power flows of each motor.

In one example, battery discharge power may be defined as positive and battery charge power may be defined as negative. The net maximum electrical power limit available for all motors of a BEV system may be calculated as battery discharge limit minus HV accessory load power consumption. The net minimum electrical power limit available for all motors of the BEV system may be calculated as battery charge limit minus HV accessory load power consumption.

Control routines for power allocation control in 3-motor and/or 4-motor BEV systems are described below with reference to FIG. 3, FIG. 4, FIG. 5, FIG. 6A and FIG. 6B. In the present disclosure, method 300 illustrates inputs for power allocation control among an energy storage device and the motors of a BEV system (such as electric energy storage device 132, electric machines 135, 123, 120, and vehicle propulsion system 100 in FIG. 1) and the selection of motors of the system for open-loop and closed-loop power allocation control. Method 300 directs to example methods 400, 500, 600 and 650 disclosed herein for executing power allocation control. Method 300 of FIG. 3 may be incorporated into and may cooperate with the system of FIG. 1 and the rest of the methods described herein. Further, at least portions of the method of FIG. 3 may be incorporated as executable instructions stored in non-transitory memory while other portions of the method may be performed via a controller transforming operating states of devices and actuators in the physical world.

At 302, method 300 obtains power allocation control inputs for the system. Power allocation control inputs may include a motor torque request and a motor speed request for each motor positioned at a wheel, or for each axle, if the vehicle is configured with a single motor per axle. Power requests, e.g., motor generating current and/or motor withdrawing current, may be separated into positive requests and negative requests, with positive requests including those sent during motor energy consumption and negative requests include those sent during motor energy regeneration. In one example, motor power request is positive when the motor is motoring such that motor torque request has the same direction as its speed. Motor power request is negative when the motor is generating such that motor torque request has the opposite direction of its speed. In one example, the motors of the system may be independently controlled. For an example 3-motor BEV, first, second, and third motors may have independently controlled torque, power, and/or speed.

At 304, method 300 obtains maximum and minimum available electrical power limits for a total of all motors of the system. In one example, electrical power limits include limits for motoring (e.g., positive) and limits for generating (e.g., negative). A motoring power limit (or positive electrical power limit) for motor withdrawing current from a battery may be calculated by subtracting a total HV accessory power consumption (e.g., positive) from a battery discharging limit (e.g., positive; see FIG. 2). A generating power limit may for motor generating current to the battery may be determined by subtracting the total HV accessory power consumption (positive) from a battery charging limit (negative).

At 306, method 300 selects a first axle for open-loop power allocation and designates a second axle (e.g., the other axle) for either open-loop power allocation or closed-loop power allocation. In one example, for 3-motor BEVs, the axle selected for open-loop control may be the axle of a first drive path with at least first and second motors. The axle designated for closed-loop control may be a second drive path with at least a third motor. In another example, for 4-motor BEVs, there may be no preference on the selection of the first axle and designation of the second axle.

At 308, method 300 determines whether the selected axle is the open-loop power allocation axle. If yes, the method continues to 310. At 310, the method includes executing open-loop power allocation control. Open-loop power allocation control is described in method 400 of FIG. 4. Open-loop control of the selected axle determines the power allocation for the motors at the axle, e.g., first and second motors, using the inputs described above including motor torque request, motor speed request, and electrical power limits (e.g., battery maximum power limit, battery minimum power limit). Open-loop power allocation does not include axle feedback of an actual electrical power consumed by the motor(s) in the second drive path. For example, open-loop power allocation does not include axle feedback from the third motor in 3-motor BEV configurations or from the third motor and fourth motor in 4-motor BEV configurations.

Returning to 308, if the selected axle is not the open-loop power allocation axle, the method continues to 312. At 312, the method includes executing closed-loop power allocation control. Closed-loop power allocation control is described in methods 500, 600 and 650. Closed-loop control determines the power allocation for the selected motor(s) at the axle, with the inputs described above, and includes feedback including an actual electrical power consumed by the motors of the first drive path and the motors of the second drive path. In one example, closed-loop power allocation control of one motor of the second drive path may include feedback including an actual electrical power consumed by all other motors on the first drive path and the second drive path. As another example, closed-loop control in 3-motor BEV configurations may include axle feedback including actual power consumed by the first and second motors of the first drive path.

Method 400 illustrates an example open-loop control for a first and second motor of a BEV system with at least three motors. Power limits for each motor at the selected open-loop control axle are calculated and allocated for motor operation in the method disclosed herein.

At 402, method 400 includes determining the desired power request from each motor of the vehicle. In one example, the power request from each motor of the vehicle is the product of the torque request and the motor speed request. The power request may be calculated as follows: pwr_request_xx=tq_req_xx*mtr_spd_xx, where xx can be fl (front left), fr (front right), rr (rear right), or rl (rear left) motor.

At 404, method 400 includes determining a total of desired positive power request and a total of desired negative power requests. In one example, the positive power and negative power requests from all motors of the vehicle may be separated as follows: pwr_req_pos_sum=sum of all (pwr_req_xx≥0) and pwr_req_neg_sum=sum of all (pwr_req_xx<0).

At 406, method 400 includes determining an arbitrated torque request for each motor of the vehicle and separating total positive power requests and total negative power requests using the arbitrated torque request. In one example, the arbitrated torque request is a value arbitrated between desired and actual motor torque request. Arbitration may be conducted irrespective of the signs of the torques. In one example, the arbitrated torque request for each motor may be described as follows: tq_req_arb_xx=Arb*(tq_req_xx_, tq_req_cmd_xx). In one example, an arbitration logic may be a minimum absolute value of the desired motor torque request and the actual motor torque request if both are positive. An arbitrated power request may be based on the arbitrated torque request of each motor. The corresponding total positive and negative power requests are determined using the arbitrated requests. Arbitrated positive or negative power requests are a corresponding power request summation from the motors on the first axle and the motors on the second axle. In one example, the corresponding arbitrated positive power request may be described as follows: pwr_req_pos_sum_arb=sum of all ((tq_req_arb_xx* mtr_spd_xx)≥0). The corresponding arbitrated negative power request may be described as follows: pwr_req_neg_sum_arb=sum of all ((tq_req_arb_xx*mtr_spd_xx)<0). Total arbitrated positive power requests and total arbitrated negative power requests may be used for determining adjusted power limits at 408. In one example, adjusting electrical power limits using arbitrated power requests rather than desired requests enables more robust adjustment by the less capable power request.

At 408, method 400 includes adjusting available electrical power limits by adjusting a battery maximum power limit, herein referred to as a positive power limit, with arbitrated negative power request and adjusting a battery minimum power limit, herein referred to as negative power limit, with arbitrated positive power request. In one example, each motor may draw from or generate current to the battery, and the requested motor power can be in a discharging or a charging direction. As such, the available electrical power limits in each direction may be adjusted by the power request from its opposite direction, while still maintaining the total net available electrical power limits. For example, the positive power limit adjustment may be calculated by subtracting a total arbitrated negative power request from the total positive power limit: tot_pwr_max_adj=tot_pwr_max−pwr_req_neg_sum_arb. For example, the negative power limit adjustment may be calculated by subtracting a total arbitrated positive power request from the total negative power limit: tot_pwr_min_adj=tot_pwr_min−pwr_req_pos_sum_arb.

At 410, method 400 instructs to begin an execution for each motor of the axle selected for open-loop control. At 412, method 400 includes determining whether the selected motor for power allocation limit determination is requesting positive power. In one example, the selected motor may be a front left, front right, etc. motor. The determination at 412 is made to separate power allocation for a motor with positive power request from a motor with a negative power request. If at 412 the power request for the selected motor is greater than or equal to zero, e.g., a positive request, method 400 continues to 414. In one example, when the power request is zero, a small amount of discharge power limit may still be reserved for the motor.

At 414, method 400 includes determining a power allocation ratio based on an individual motor power request and the total positive power request from all motors. In other words, the method may determine a first power allocation ratio of the first and second motors relative to total power of the first and second axles. In one example, the power allocation may be determined separately for positive power requests and negative power requests. In one example, power allocation ratio may be obtained by dividing the power request of the selected motor by the total positive power request from all motors: rt_split_yy=pwr_req_yy/pwr_req_pos_sum, where yy can be fl (front left) and/or fr (front right) in an example where the front axle is selected for open-loop control.

At 416, method 400 includes determining a raw maximum power limit for the selected motor based on the power allocation ratio and the adjusted positive power limit. In one example, the raw maximum power limit is the product of the power allocation ratio and the adjusted positive power limit.

In one example, the raw maximum power limit may be calculated as follows: pwr_max_*yy*=rt_split_*yy**tot_pwr_max_adj.

At 418, method 400 includes clipping the raw maximum power limit for the selected motor based on the individual motor power request and a calibratable threshold. In one example, the threshold can be calibrated and represented via, e.g., a constant, a look up table with motor torque and motor speed as inputs, as multiplication of a ratio times the motor power request, where the ratio can be a constant calibration, or a calibration based on motor power or torque request or speed level. The raw maximum power limit may be clipped as follows: pwr_max_yy=min (pwr_max_yy, pwr_req_yy+pwr_thres_yy).

At 420, method 400 includes setting the power limit for the motor to zero: pwr_min_yy=0 or a nominal value.

Returning to 412, if the power request for the selected motor is determined to be less than zero, e.g., a negative request, method 400 continues to 422. Power limit allocation for the selected motor with negative power request may be determined similarly to the motor with positive power request via the same method of calculation and corresponding inputs.

At 422, method 400 includes determining a power allocation ratio based on an individual motor power request and the total negative power request from all motors. In one example, the power allocation ratio may be obtained by dividing the power request of the selected motor by the total negative power request from all motors: rt_split_yy=pwr_req_yy/pwr_req_neg_sum, where yy can be fl (front left) and/or fr (front right) in an example where the front axle is selected for open-loop control.

At 424, method 400 includes determining a raw minimum power limit for the selected motor based on the power allocation ratio and the adjusted minimum power limit. In one example, the raw minimum power limit is the product of the power allocation ratio and the adjusted negative power limit. In one example, the raw maximum power limit may be calculated as follows: pwr_min_*yy*=rt_split_*yy**tot_pwr_min_adj.

At 426, method 400 includes clipping the raw minimum power limit for the selected motor based on individual motor power request and a calibratable threshold. In one example, the threshold can be calibrated and represented via e.g., a constant, a look up table with motor torque and motor speed as inputs, as multiplication of a ratio times the motor power request, where the ratio can be a constant calibration, or a calibration based on motor power or torque request or speed level. The raw minimum power limit may be clipped as follows: pwr_min_yy=max (pwr_min_yy, pwr_req_yy+pwr_thres_yy).

At 428, method 400 includes setting the power limit for the motor to zero: pwr_min_yy=0 or a nominal value.

Turning now to FIG. 5, in one example, the axle that is not selected for open-loop control may use closed-loop power allocation control. Method 500 illustrates closed-loop control for a third motor controlling a pair of wheels of a second axle in a 3-motor BEV configuration. A positive power limit and a negative power limit for the third motor at the designated closed-loop control axle is calculated and allocated for motor operation in the method disclosed herein.

Figure 3:
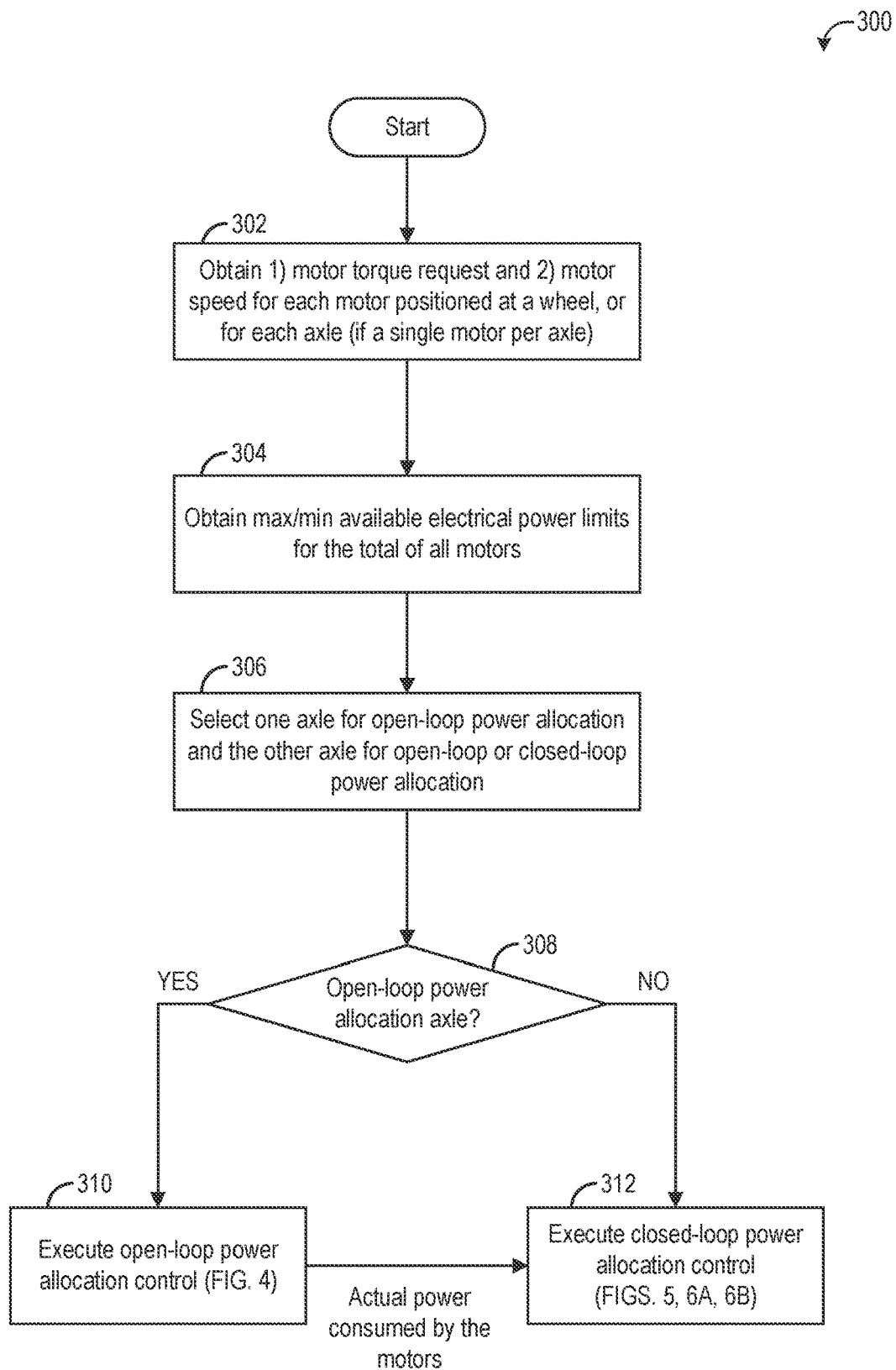
FIG. 3 is a flow chart illustrating power allocation inputs and open-loop versus closed-loop power allocation.

At 502, method 500 includes determining available electrical power limits for the axle not selected for open-loop power allocation control (see FIG. 3). In one example, the electrical power limits may be the net total available power maximum and power minimum of the plurality of motors of the system, taken out of the total power consumed by the motors at the open-loop axle. In other words, the method may determine a second power allocation ratio of the third motor relative to the total power of the second axle. The maximum electrical power limit may be calculated as follows: tot_pwr_max_claxle=tot_pwr_max−pwr_act_olaxle, where claxle stands for closed-loop axle and olaxle stands for open-loop axle. The minimum electrical power limit may be calculated as follows: tot_pwr_min_claxle=tot_pwr_min−pwr_act_olaxle. In a 3-motor BEV, as the axle selected for closed-loop control has only one motor, the determined electrical power minimum and electrical power maximum may be fully allocated to the motor.

FIG. 6A and FIG. 6B illustrate first and second embodiments, in methods 600 and 650, respectively, for closed-loop control of a pair of independently controlled motors of a common axle, such as in a 4-motor BEV. For 4-motor BEV configurations, power limits may be split between the left and right motors. As shown in method 600 and method 650, total positive and negative power request are determined for the closed-loop control axle and the adjusted electrical limits for the axle are calculated and allocated for motor operation. Method 600 includes a first embodiment wherein equivalent right and left motor power allocation is described, e.g., where the right and left motors may be treated as the same. For example, method 600 includes an example where power allocation may be determined using the same method of calculation as open-loop, except using the total of adjusted power limits (e.g., maximum battery power limit, minimum battery power limit) and total of positive power request and negative power request for the motors of the selected axle instead of the plurality of motors of the vehicle. FIG. 6B includes a second embodiment, wherein the right and left motors are handled differently. For example, method 650 includes selecting a first motor of the axle for power allocation limits determined similarly as described in FIG. 6A and selecting a second motor of the axle for power allocation limits determined after taking out the actual power consumed by the first motor of the axle.

Turning first to FIG. 6A, method 600 illustrates closed-loop control for a pair of independently controlled motors of the system. Power maximum and power minimum limits for each motor at the selected closed-loop control axle are calculated and split between the motors in the method disclosed herein.

At 602, method 600 includes determining available electrical power limits for the axle selected for closed-loop control. In one example, the electrical power limits may be the net total available power maximum and power minimum of the plurality of motors of the system, taken out of the total power consumed by the motors at the open-loop axle. The maximum electrical power limit may be calculated as follows: tot_pwr_max_claxle=tot_pwr_max−pwr_act_olaxle, where claxle stands for closed-loop axle and olaxle stands for open-loop axle. The minimum electrical power limit may be calculated as follows: tot_pwr_min_claxle=tot_pwr_min−pwr_act_olaxle.

At 604, method 600 includes determining a power request from each motor of the axle selected for closed-loop control. In one example, the power request from each motor of the axle is the product of the torque request and the motor speed request. The power request may be calculated as follows: pwr_request_zz=tq_req_zz*mtr_spd_zz, where zz can be fl (front left), fr (front right), rr (rear right), or rl (rear left) motor, dependent on which axle was selected for open-loop control.

At 606, method 600 includes determining a total of desired positive power request and a total of desired negative power requests from all motors of the selected axle. In one example, the positive power and the negative power requests from all motors of the selected axle may be separated as follows: pwr_req_pos_sum_claxle=sum (pwr_req_zz≥0) and pwr-req_neg_sum_claxle=sum (pwr_req_zz<0).

At 608, method 600 includes determining an arbitrated torque request for each motor of the axle and separating the total positive power requests and the total negative power requests using the arbitrated torque request. In one example, the arbitrated torque request for each motor of the axle may be described as follows: tq_req_arb_zz=Arb*(tq_req_zz_, tq_req_cmd_zz). In one example, an arbitration logic may be a minimum absolute value of the desired motor torque request and the actual motor torque request if both are positive. The total arbitrated positive and negative power requests are determined using the above described torque and motor speed for the motors of the selected axle. In one example, the arbitrated positive power request may be described as follows: pwr_req_pos_sum_claxle_arb. The corresponding arbitrated negative power request may be described as follows: pwr_req_neg_sum_claxle_arb. Total arbitrated positive and total negative power requests may be used for determining available electrical power limits at 610.

At 610, method 600 includes adjusting the available electrical power limits for the axle selected for closed-loop control by adjusting the positive power limit with the arbitrated negative power request and adjusting the negative power limit with the arbitrated positive power request. For example, the positive power limit adjustment may be calculated by subtracting the total arbitrated negative power request for the axle from the total positive power limit for the axle: tot_pwr_max_adj_claxle=tot_pwr_max_claxle−pwr_req_neg_sum_claxle_arb. The negative power limit adjustment may be calculated by subtracting total arbitrated positive power request for the axle from the total negative power limit for the axle: tot_pwr_min_adj_ claxle= tot_pwr_min_claxle−pwr_req_pos_sum_claxle_arb.

At 612, method 600 instructs to begin an execution for each motor of the axle selected for closed-loop control. At 614, method 600 includes determining whether the motor selected for power allocation is requesting positive power. In one example, the selected motor may be a rear left, rear right, etc., e.g., dependent upon which axle is selected for open-loop control. The determination at 614 separates power allocation for a motor with a positive power request from a motor with a negative power request. If at 614 the power request for the selected motor is greater than or equal to zero, e.g., a positive request, method 600 continues to 616.

At 616, method 600 includes determining a power allocation ratio based on the power request of the selected motor and total positive power request for the motors of the axle selected for closed-loop control. In one example, power allocation ratio may be obtained by dividing the power request of the selected motor by the total positive power request for the motors of the selected axle: rt_split_yy=pwr_req_yy/pwr_req_pos_sum_claxle.

At 618, method 600 includes determining a raw maximum power limit for the selected motor based on the power allocation ratio and adjusted positive power limit for the selected axle. In one example, the raw maximum power limit is the product of the power allocation ratio and the adjusted positive power limit for the selected axle. In one example, the raw maximum power limit may be calculated as follows: pwr_max_yy=rt_split_yy*tot_pwr_ max_adj_claxle.

At 620, method 600 includes clipping the raw maximum power limit for the selected motor based on individual motor power request and a calibratable threshold. In one example, the threshold can be calibrated and represented via e.g., a constant, a look up table with motor torque and motor speed as inputs, as multiplication of a ratio times the motor power request, where the ratio can be a constant calibration, or a calibration based on motor power or torque request or speed level. The raw maximum power limit may be clipped as follows: pwr_max_yy=min (pwr_max_yy, pwr_req_yy+pwr_thres_yy).

At 622, method 600 includes setting the power limit for the motor to zero: pwr_min_yy=0 or a nominal value.

Returning to 614, if the power request for the selected motor is less than zero, e.g., a negative request, method 600 continues to 624.

At 624, method 600 includes determining a power allocation ratio based on the power request of the selected motor and total negative power request for the motors of the axle selected for closed-loop control. In one example, the power allocation ratio may be obtained by dividing the power request of the selected motor by the total negative power request for the motors of the selected axle: rt_split_yy=pwr_req_yy/pwr_req_neg_sum_claxle.

At 626, method 600 includes determining a raw minimum power limit for the selected motor based on the power allocation ratio and adjusted minimum power limit for the selected axle. In one example, the raw minimum power limit is the product of the power allocation ratio and the adjusted minimum power limit for the selected axle. In one example, the raw minimum power limit may be calculated as follows: pwr_min_yy=rt_split_yy*tot_pwr_min_adj_claxle.

At 628, method 600 includes clipping the raw minimum power limit for the selected motor based on individual motor power request and a calibratable threshold. In one example, the threshold can be calibrated and represented via e.g., a constant, a look up table with motor torque and motor speed as inputs, as multiplication of a ratio times the motor power request, where the ratio can be a constant calibration, or a calibration based on motor power or torque request or speed level. The raw minimum power limit may be clipped as follows: pwr_min_yy=max (pwr_min_yy, pwr_req_yy+pwr_thres_yy).

At 630, method 600 includes setting the power limit for the motor to zero: pwr_min_yy=0 or a nominal value.

Turning now to FIG. 6B, method 650 illustrates a second embodiment of a method for closed-loop control for a first motor and a second motor of a pair of independently controlled motors of the system. Power maximum and power minimum limits for the first motor at the selected closed-loop control axle is calculated similar to method 600. Then, minimum and maximum power limits for the second motor of the axle are determined based on the actual power consumed by the first motor. In this way, two levels of closed-loop control are executed for the designated axle.

At 652, method 650 includes determining available electrical power limits for the axle designated for closed-loop control. As above in method 600, the electrical power limits may be the net total available power maximum and power minimum of the plurality of motors of the system, taken out of the total power consumed by the motors at the open-loop axle. The maximum electrical power limit may be calculated as follows: tot_pwr_max_claxle=tot_pwr_max−pwr_act_olaxle, where claxle stands for closed-loop axle and olaxle stands for open-loop axle. The minimum electrical power limit may be calculated as follows: tot_pwr_min_claxle=tot_pwr_min−pwr_act_olaxle.

At 654, method 650 includes determining a power request from each motor of the axle selected for closed-loop control. The power request may be calculated as follows: pwr_request_zz=tq_req_zz*mtr_spd_zz, where zz can be fl (front left), fr (front right), rr (rear right), or rl (rear left) motor, dependent on which axle was selected for open-loop control.

At 656, method 650 includes determining a total of desired positive power request and a total of desired negative power requests from all motors of the selected axle. In one example, the positive power and negative power requests from all motors of the selected axle may be separated as follows: pwr_req_pos_sum_claxle=sum (pwr_req_zz≥0) and pwr-req_neg_sum_claxle=sum (pwr_req_zz<0).

At 658, method 650 includes determining an arbitrated torque request for each motor of the axle and separating the total positive power requests and the total negative power requests using the arbitrated torque request. In one example, the arbitrated torque request for each motor of the axle may be described as follows: tq_req_arb_zz=Arb*(tq_req_zz_, tq_req_cmd_zz). The total positive and negative power requests are determined using the previously described torque and motor speed for the motors of the selected axle. In one example, the arbitrated positive power request may be described as follows: pwr_req_pos_sum_claxle_arb. The corresponding arbitrated negative power request may be described as follows: pwr_req_neg_sum_claxle_arb. Total arbitrated positive and total negative power requests may be used for determining available electrical power limits at 660.

At 660, method 600 includes adjusting the available electrical power limits for the axle selected for closed-loop control by adjusting the positive power limit with the arbitrated negative power request and adjusting the negative power limit with the arbitrated positive power request. For example, the positive power limit adjustment may be calculated by subtracting the total arbitrated negative power request for the axle from the total positive power limit for the axle: tot_pwr_max_adj_claxle=tot_pwr_max_claxle−pwr_req_neg_sum_claxle_arb. The negative power limit adjustment may be calculated by subtracting total arbitrated positive power request for the axle from the total negative power limit for the axle: tot_pwr_min_adj_claxle=tot_pwr_min_claxle−pwr_req_pos_sum_claxle_arb.

At 661, method 650 designates a first motor (e.g., motor 1) and a second motor (e.g., motor 2) of the axle. Method 650 determines power allocation limits for the first motor of the axle similar to method 600 in FIG. 6A. Method 650 determines power allocation limits for the second motor of the axle based on the power actually consumed by the first motor. At 662, the calculation begins by determining whether the first motor is requesting positive power. In one example, the first motor may be a rear left, rear right, etc., e.g., dependent upon which axle is selected for open-loop control. If at 662 the power request for the first motor is greater than or equal to zero, e.g., a positive request, method 650 continues to 664.

At 664, method 650 includes determining a power allocation ratio based on the power request of the first motor and total positive power request for the motors of the axle selected for closed-loop control. In one example, the power allocation ratio may be obtained by dividing the power request of the first motor by the total positive power request for the motors of the selected axle: rt_split_yy=pwr_req_yy/pwr_req_pos_sum_claxle.

At 666, method 600 includes determining a raw maximum power limit for the first motor based on the power allocation ratio and adjusted positive power limit for the selected axle. In one example, the raw maximum power limit is the product of the power allocation ratio and the adjusted positive power limit for the selected axle. In one example, the raw maximum power limit may be calculated as follows: pwr_max_yy=rt_split_yy*tot_pwr_max_adj_claxle.

At 668, method 650 includes clipping the raw maximum power limit for the first motor based on the individual motor power request and a calibratable threshold. In one example, the threshold can be calibrated and represented via e.g., a constant, a look up table with motor torque and motor speed as inputs, as multiplication of a ratio times the motor power request, where the ratio can be a constant calibration, or a calibration based on motor power or torque request or speed level. The raw maximum power limit may be clipped as follows: pwr_max_yy=min (pwr_max_yy, pwr_req_yy+pwr_thres_yy).

At 670, method 650 includes setting the power limit for the first motor to zero: pwr_min_yy=0 or a nominal value.

Returning to 662, if the power request for the first motor is less than zero, e.g., a negative request, method 650 continues to 672.

At 672, method 650 includes determining a power allocation ratio based on the power request of the first motor and the total positive power request for the motors of the axle selected for closed-loop control. In one example, the power allocation ratio may be obtained by dividing the power request of the first motor by the total negative power request for the motors of the selected axle: rt_split_yy=pwr_req_yy/pwr_req_neg_sum_claxle.

At 674, method 650 includes determining a raw minimum power limit for the first motor based on the power allocation ratio and adjusted minimum power limit for the selected axle. In one example, the raw minimum power limit is the product of the power allocation ratio and the adjusted minimum power limit for the selected axle. In one example, the raw minimum power limit may be calculated as follows: pwr_min_yy=rt_split_yy*tot_pwr_min_adj_claxle.

At 676, method 650 includes clipping the raw minimum power limit for the first motor based on individual motor power request and a calibratable threshold. In one example, the threshold can be calibrated and represented via e.g., a constant, a look up table with motor torque and motor speed as inputs, as multiplication of a ratio times the motor power request, where the ratio can be a constant calibration, or a calibration based on motor power or torque request or speed level. The raw minimum power limit may be clipped as follows: pwr_min_yy=max (pwr_min_yy, pwr_req_yy+pwr_thres_yy).

At 678, method 650 includes setting the power limit for the first motor to zero: pwr_min_yy=0 or a nominal value.

Upon determining power allocation limits for the first motor of the closed-loop axle, method 650 includes determining power allocation limits for the second motor. At 680, the method includes determining available electrical power limits for the second motor, e.g., the rear left, based on actual power consumption by the open-loop axle and the first motor on the closed-loop axle. In one example, the maximum and minimum limits are calculated by subtracting the first motor actual consumption from closed-loop axle maximum and minimum power limits. In one example, the maximum power limit for the second motor of the closed-loop axle may be calculated as follows: pwr_max_clmtr2=tot_pwr_max_claxle−pwr_act_clmtr1. In one example, the minimum power limit for the second motor of the closed-loop axle may be calculated as follows: pwr_min_clmtr2=tot_pwr_min_clax1−pwr_act_clmt1.

In this way, a first drive path with at least first and second independently controlled motors may be selected for open-loop power control and a second drive path with at least a third independently controlled motor may be designated for closed-loop power control. Power requests of each motor may be separated into positive requests and negative requests, where requests sent during motor energy consumption are positive and requests sent during motor energy regeneration are negative. A power allocation ratio may be determined for each motor of the BEV based on the motor power request over the total power request (per open-loop and closed-loop modes) with the same sign direction (e.g., positive or negative) and power limits adjusted based on the requests.

Turning now to FIG. 7, a timing diagram 700 is shown that illustrates a sequence of actions performed within a control routine for battery power allocation for an exemplary 3-motor BEV. The control routine may be the same as or similar to the series of actions described above in reference to methods 300, 400, and 500 in FIGS. 3, 4, and 5, respectively. The 3-motor BEV may be the same as or similar to vehicle propulsion system 100 shown in FIG. 1. In the example, a first drive path with first and second motors of a first axle are selected for open-loop control (e.g., electric machine 123, electric machine 135, front axle 133 in FIG. 1) and a second drive path with a third motor of a second axle is designated for open-loop control (e.g., electric machine 120, rear axle 122 in FIG. 1). Instructions for performing the battery power allocation control described in the timing diagram 700 of FIG. 7 may be executed by a controller (e.g., the controller 12 of control system 14 of FIG. 1) based on instructions stored on a memory of the controller and in conjunction with sensory feedback received from components from the vehicle propulsion system, including sensors 16, electric machine 135, electric machine 120, electric machine 123, and electric energy storage device 132 described above with reference to FIG. 1. The horizontal (x-axis) denotes time and the vertical markers t0-t4 identify relevant times in methods 300, 400, and 500 of FIGS. 3, 4, and 5, respectively, for allocating battery power in a 3-motor BEV.

Timing diagram 700 shows plots 702, 704, 706, 708, 710, 712, 714, 716, 718, 720, 722, 724, which illustrate states of components and/or control settings of the vehicle system over time. Plots 702, 704, and 706 indicate motor torque request from a first motor, a second motor, and a third motor of the vehicle propulsion system, respectively (e.g., motors 123, 135, and 134 of vehicle propulsion system 100 in FIG. 1), which may be negative or positive. Plots 708, 710, and 712 indicate a motor speed for a first motor, a second motor, and a third motor, respectively. Plots 714 and 716 indicate first motor allocated maximum and minimum power, respectively. Plots 718 and 720 indicate second motor allocated maximum and minimum power, respectively. Plots 722 and 724 indicate third motor allocated maximum and minimum power, respectively. Plots 702, 704, 706, 714, 716, 718, 720, 722, 724 show a positive increase upwards along the y-axis and values become increasingly more negative down the y-axis. Plots 708, 710, 712, show an increase upwards along the y-axis, this illustration assumes all motor speeds are positive, and total electrical power limits for the total of all motors are relatively constant.

Plots 702, 704, 706, 708, 710, 712, 714, 716, 718, 720, 722, 724 illustrate states of the above mentioned components and/or operating conditions of the vehicle system across four durations: a first duration from time t0 to time t1; a second duration from time t1 to time t2; a third duration from time t2 to time t3; a fourth duration from time t3 to time t4.

From time t0 to t1, plots 702, 704, and 706 illustrate positive torque requests for first motor, second motor, and third motor, respectively. Plots 708, 710, and 712 show relatively constant motor speeds for the first, second, and third motor, respectively. Allocated minimum power and allocated maximum power are distributed among the first, second, and the third motors based on the total request.

At t1, plots 702, 704 show first motor torque request and second motor torque request, respectively, are negative. Plot 706 shows third motor torque request is negative. In response to decreasing of individual and total positive power request and increasing of individual and total negative power request, maximum and minimum power allocations are adjusted for the first, second and third motors. In response to the power allocation ratio changing, plots 714, 718, and 722 show allocated maximum power decreased to first, second, and third motors, respectively, and allocated minimum power increased to first, second, and third motors, shown in plots 716, 720, 724, respectively. That is, the minimum power allocation becomes more negative. From t1 to t2, maximum and minimum power allocation are relatively constant. As time approaches t2, plot 702 shows the first motor torque request increasing and plot 704 shows the second motor torque request decreasing.

At t2, second motor torque request is negative, shown in plot 704. First motor torque request is positive, shown in plot 702. Third motor torque request remains negative, shown in plot 706. Plots 708, 710, 712 show first, second, and third motor speeds remain relatively constant. From t2 to t3, plot 702 shows first motor torque request increases, peaks, and decreases as time approaches t3. Plot 704 shows second motor torque request decreases, dips, and increases as time approaches t3. In response to increasing positive motor torque request, plot 714 shows battery maximum power limit allocated to the first motor is increased. In one example, the maximum allocation may be increased if there is no decrease of the total battery discharge power limit. At the same duration, second and third motor maximum power allocation remain relatively constant. Allocated maximum power increases only to the first motor in response to the positive motor torque and power request increase from the first motor only. As first motor torque peaks and decreases, first motor allocated maximum power peaks and decreases. In response to increasing negative motor torque request, plot 720 shows allocated minimum power to the second motor only increased (steeply) and held constant as time approaches t3. In one example, the minimum power limit may be increased if there is no decrease of total battery charge power limit. Plot 716 shows first motor allocated minimum power reduced somewhat and held constant thereafter. Plot 724 shows allocated minimum power to the third motor slightly reduced while the second motor negative power request increases, as both motors request negative power.

At t3, the vehicle turns and motor speed is different between first and second motors. Plot 710 shows second motor speed request decreases relative to first motor speed, shown in plot 708. From t3 to t4, plot 702 shows first motor torque request reduces to negative. At the same time, plot 704 shows second motor torque request increases to positive. Plot 706 shows third motor torque request remains negative. Allocated maximum and allocated minimum power are adjusted for each motor in response to changing power requests. First motor allocated maximum power reduces steeply after t3 and remains constant thereafter, shown in plot 714. First motor allocated minimum power increases steeply after t3 and remains constant thereafter, shown in plot 716. Second motor allocated maximum power increases steeply after t3 and remains constant thereafter, shown in plot 718. Second motor allocated minimum power decreases after t3 and remains constant thereafter, shown in plot 720. Third motor maximum power remains relatively constant, shown in plot 722. Third motor allocated minimum power increases briefly and returns to a relatively constant level, shown in plot 724. The brief increase in negative power allocation to the third motor returning to a lower, constant level reflects the relative magnitude of the negative power request by the third motor compared to the negative power request by the first motor.

In this way, power allocation to independently controlled motors of a BEV may be adjusted in response to changing power requests.

The systems and methods described herein enable battery power allocation control up to the charge and discharge limit for 3-motor and 4-motor BEV configurations. By controlling a first axle in an open-loop mode and second axle in an open-loop mode or a closed-loop mode, motor torque and speed operating conditions driven by independent wheel torque control may be represented more robustly and during varied motor operating conditions. The battery power allocation control systems and methods of described herein have the technical effect of minimizing feedback conflict between independently controlled motors while allowing full utilization of battery capability.

The disclosure also provides support for a method for an electric vehicle battery distribution among at least three motors, the method comprising: selecting a first drive path with at least first and second motors for an open-loop power allocation control, designating a second drive path with at least a third motor for an open-loop or a closed-loop power allocation control, determining a power allocation ratio of each motor relative to a total power request, determining adjusted power limits based on arbitrated power requests, and operating each motor with allocated power limits based on the adjusted power limits and the determined power allocation ratio. In a first example of the method, the first drive path includes a first axle, and the second drive path includes a second axle. In a second example of the method, optionally including the first example, the second drive path with at least a third motor is designated for closed-loop control and determining the power allocation ratio of each motor relative to the total power request includes determining a first power allocation ratio of the first and second motors relative to total power request of the first axle and the second axle and determining a second power allocation ratio of the third motor relative to total power request of the second axle. In a third example of the method, optionally including one or both of the first and second examples, each of the first and second motors, and the third motor is independent. In a fourth example of the method, optionally including one or more or each of the first through third examples, the method further comprises: separating power requests of each motor into positive requests and negative requests. In a fifth example of the method, optionally including one or more or each of the first through fourth examples, determining the power allocation ratio is determined separately for positive power requests and negative power requests, and wherein the power allocation ratio for each motor is determined based on a power request divided by the total power request with a same positive or negative sign. In a sixth example of the method, optionally including one or more or each of the first through fifth examples, the adjusted power limits include adjusting a battery maximum power limit based on arbitrated negative power requests and adjusting a battery minimum power limit based on arbitrated positive power requests. In a seventh example of the method, optionally including one or more or each of the first through sixth examples, the second drive path with at least a third motor is designated for closed-loop control and for the first and second motors on the first axle, arbitrated positive or negative power requests are a corresponding power request summation from the motors on the first axle and the motors on the second axle, and for the at least a third motor on the second axle, arbitrated positive or negative power requests are the corresponding power request summation only from the motors on the second axle. In an eighth example of the method, optionally including one or more or each of the first through seventh examples, an arbitrated power request is based on an arbitrated torque request of each motor, wherein the arbitrated torque request is a minimum absolute value of desired and actual motor torque request when both have same sign. In a ninth example of the method, optionally including one or more or each of the first through eighth examples, the allocated power limits for each motor include a battery discharging limit for motor withdrawing current from a battery and a battery charging limit for motor generating current to the battery. In a tenth example of the method, optionally including one or more or each of the first through ninth examples, closed-loop power allocation control includes feedback including an actual electrical power consumed by the motors in the first drive path, while open-loop power allocation control does not include axle feedback of the actual electrical power consumed by the motors in the second drive path. In a eleventh example of the method, optionally including one or more or each of the first through tenth examples, the second drive path with at least a third motor is designated for closed-loop control, the allocated power limits for the second axle are a net total available power maximum and power minimum of the first and second motors on the first axle and the at least a third motor on the second axle taken out of the total power consumed by the first and second motors at the first axle. In a twelfth example of the method, optionally including one or more or each of the first through eleventh examples, the second drive path has a third motor only, the electrical power limits for the third motor is the same as the electrical power limits for the second axle. In a thirteenth example of the method, optionally including one or more or each of the first through twelfth examples, closed-loop power allocation control of the at least a third motor of the second drive path includes feedback including an actual electrical power consumed by all other motors on the first drive path and the second drive path. In a fourteenth example of the method, optionally including one or more or each of the first through thirteenth examples, the first drive path with first and second motors is selected for open-loop power allocation control and in response to an increasing power allocation ratio of a positive power request for a first motor or a second motor of the first drive path only, a maximum power limit allocated to the first motor or the second motor of the first drive path only is increased if there is no decrease of total battery discharge power limit, and wherein in response to the increasing power allocation ratio of negative power request for the first motor or the second motor of the first drive path only, a minimum power limit for each motor is increased if there is no decrease of the total battery charge power limit, and, wherein in response to decreasing power allocation ratio of positive power request for the first motor or the second motor of the first drive path only, the maximum power limit allocated to the first motor or the second motor of the first drive path only is decreased, and, wherein in response to the decreasing power allocation ratio of negative power request, for the first or the second motor of the first drive path only, the minimum power limit allocated to the first motor or the second motor of the first drive path only is decreased if there is no decrease of the total battery discharge power limit and the total battery charge power limit. The disclosure also provides support for a system for a vehicle, comprising: an electric vehicle battery, a first motor and a second motor coupled to a first axle of the vehicle, at least a third motor coupled to a second axle of the vehicle, and a control system with instructions therein for selecting a first drive path with at least the first and second motors for an open-loop power allocation control, designating a second drive path with the at least a third motor for an open-loop or a closed-loop power allocation control, determining a power allocation ratio of each motor relative to a total power request, determining adjusted power limits based on arbitrated power requests, and operating each motor with allocated power limits based on the adjusted power limits and the determined power allocation ratio. In a first example of the system, the control system designates the second drive path for closed-loop power allocation control, wherein actual electrical power consumed by the first motor and the second motor in the first drive path are considered to determine total electrical power available for the second axle. In a second example of the system, optionally including the first example, determining the power allocation ratio of each motor relative to the total power request includes determining a first power allocation ratio of the first motor and second motor relative to total power request of the first axle and the second axle and determining a second power allocation ratio of the third motor relative to total power request of the second axle, the control system further comprising instructions for separating power requests of each motor into positive requests and negative requests, wherein determining the power allocation ratio is determined separately for positive power requests and negative power requests, and power allocation ratio for each motor is determined based on the power request of the motor divided by the total power request with a same positive or negative sign. The disclosure also provides support for a method for an electric vehicle battery distribution among at least three motors, the method comprising: selecting a first drive path with at least first and second motors for an open-loop power allocation control, designating a second drive path with at least a third motor for an open-loop or a closed-loop power allocation control, determining a power allocation ratio of each motor relative to a total power request, determining adjusted power limits based on arbitrated power requests, and operating each motor with allocated power limits based on the adjusted power limits and the determined power allocation ratio, wherein the first drive path includes a first axle, and the second drive path includes a second axle, and wherein for the first and second motors on the first axle, arbitrated positive or negative power requests are a corresponding power request summation from the motors on the first axle and the second axle, and for the at least a third motor on the second axle, arbitrated positive or negative power requests are the corresponding power request summation only from the motors on the second axle. In a first example of the method, the power allocation ratio is determined separately for positive power requests and negative power requests, and wherein the power allocation ratio for each motor is determined based on the power request of the motor divided by the total power request with a same positive or negative sign.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an electric vehicle battery distribution among at least three motors, the method comprising:
   selecting a first drive path with at least first and second motors for an open-loop power allocation control;
   designating a second drive path with at least a third motor for an open-loop or a closed-loop power allocation control;
   determining a power allocation ratio of each motor relative to a total power request;
   determining adjusted power limits based on arbitrated power requests; and
   operating each motor with allocated power limits based on the adjusted power limits and the determined power allocation ratio.

2. The method of claim 1, wherein the first drive path includes a first axle and the second drive path includes a second axle.

3. The method of claim 2, wherein the second drive path with at least the third motor is designated for closed-loop control and determining the power allocation ratio of each motor relative to the total power request includes determining a first power allocation ratio of the first and second motors relative to a total power request of the first axle and the second axle and determining a second power allocation ratio of the third motor relative to the total power request of the second axle.

4. The method of claim 2, wherein the adjusted power limits include adjusting a battery maximum power limit based on arbitrated negative power requests and adjusting a battery minimum power limit based on arbitrated positive power requests.

5. The method of claim 4, wherein the second drive path with at least the third motor is designated for closed-loop control and, for the first and second motors on the first axle, arbitrated positive or negative power requests are a corresponding power request summation from the motors on the first axle and the motors on the second axle; and for the at least the third motor on the second axle, arbitrated positive or negative power requests are the corresponding power request summation only from the motors on the second axle.

6. The method of claim 4, wherein an arbitrated power request is based on an arbitrated torque request of each motor, and wherein the arbitrated torque request is a minimum absolute value of desired and actual motor torque requests when both have a same sign.

7. The method of claim 2, wherein the second drive path with at least the third motor is designated for closed-loop control, the allocated power limits for the second axle are a net total available power maximum and power minimum of the first and second motors on the first axle and the at least the third motor on the second axle taken out of the total power consumed by the first and second motors at the first axle.

8. The method of claim 7, wherein the second drive path has the third motor only, and the electrical power limit for the third motor is the same as the electrical power limits for the second axle.

9. The method of claim 1, wherein each of the first, second, and third motors is independent.

10. The method of claim 9, further comprising separating power requests of each motor into positive requests and negative requests.

11. The method of claim 10, wherein determining the power allocation ratio is determined separately for positive power requests and negative power requests, and wherein the power allocation ratio for each motor is determined based on a power request divided by the total power request with a same positive or negative sign.

12. The method of claim 1, wherein the allocated power limits for each motor include a battery discharging limit for motor withdrawing current from a battery and a battery charging limit for motor generating current to the battery.

13. The method of claim 1, wherein closed-loop power allocation control includes feedback including an actual electrical power consumed by the motors in the first drive path, while open-loop power allocation control does not include axle feedback of the actual electrical power consumed by the motors in the second drive path.

14. The method of claim 1, wherein closed-loop power allocation control of the at least the third motor of the second drive path includes feedback including an actual electrical power consumed by all other motors on the first drive path and the second drive path.

15. The method of claim 1, wherein the first drive path with the first and second motors is selected for open-loop power allocation control and, in response to an increasing power allocation ratio of a positive power request for the first motor or the second motor of the first drive path only, a maximum power limit allocated to the first motor or the second motor of the first drive path only is increased if there is no decrease of a total battery discharge power limit; wherein, in response to an increasing power allocation ratio of a negative power request for the first motor or the second motor of the first drive path only, a minimum power limit for each motor is increased if there is no decrease of a total battery charge power limit; wherein, in response to a decreasing power allocation ratio of the positive power request for the first motor or the second motor of the first drive path only, the maximum power limit allocated to the first motor or the second motor of the first drive path only is decreased; and wherein, in response to a decreasing power allocation ratio of the negative power request, for the first or the second motor of the first drive path only, the minimum power limit allocated to the first motor or the second motor of the first drive path only is decreased if there is no decrease of the total battery discharge power limit and the total battery charge power limit.

16. A system for a vehicle, comprising:
   an electric vehicle battery;
   a first motor and a second motor coupled to a first axle of the vehicle;
   at least a third motor coupled to a second axle of the vehicle; and
   a control system with instructions therein for selecting a first drive path with at least the first and second motors for an open-loop power allocation control, designating a second drive path with the at least the third motor for an open-loop or a closed-loop power allocation control, determining a power allocation ratio of each motor relative to a total power request, determining adjusted power limits based on arbitrated power requests, and operating each motor with allocated power limits based on the adjusted power limits and the determined power allocation ratio.

17. The system of claim 16, wherein the control system designates the second drive path for closed-loop power allocation control, and wherein actual electrical power consumed by the first motor and the second motor in the first drive path is considered to determine total electrical power available for the second axle.

18. The system of claim 17, wherein determining the power allocation ratio of each motor relative to the total power request includes determining a first power allocation ratio of the first motor and the second motor relative to a total power request of the first axle and the second axle and determining a second power allocation ratio of the third motor relative to a total power request of the second axle, the control system further comprising instructions for separating power requests of each motor into positive requests and negative requests, and wherein determining the power allocation ratio is determined separately for positive power requests and negative power requests, and the power allocation ratio for each motor is determined based on the power request of the motor divided by the total power request with a same positive or negative sign.

19. A method for an electric vehicle battery distribution among at least three motors, the method comprising:
selecting a first drive path with at least first and second motors for an open-loop power allocation control;
designating a second drive path with at least a third motor for an open-loop or a closed-loop power allocation control;
determining a power allocation ratio of each motor relative to a total power request;
determining adjusted power limits based on arbitrated power requests; and
operating each motor with allocated power limits based on the adjusted power limits and the determined power allocation ratio, wherein the first drive path includes a first axle and the second drive path includes a second axle, and wherein, for the first and second motors on the first axle, arbitrated positive or negative power requests are a corresponding power request summation from the motors on the first axle and the second axle; and, for the at least the third motor on the second axle, arbitrated positive or negative power requests are the corresponding power request summation only from the motors on the second axle.

20. The method of claim 19, wherein the power allocation ratio is determined separately for positive power requests and negative power requests, and wherein the power allocation ratio for each motor is determined based on the power request of the motor divided by the total power request with a same positive or negative sign.

* * * * *